(12) United States Patent
Zanini et al.

(10) Patent No.: US 8,507,577 B2
(45) Date of Patent: Aug. 13, 2013

(54) PROCESS FOR FORMING CLEAR, WETTABLE SILICONE HYDROGEL ARTICLES

(75) Inventors: Diana Zanini, Jacksonville, FL (US); Karen Altheim, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 1019 days.

(21) Appl. No.: 11/874,313

(22) Filed: Oct. 18, 2007

(65) Prior Publication Data

US 2008/0103231 A1   May 1, 2008

Related U.S. Application Data

(60) Provisional application No. 60/863,710, filed on Oct. 31, 2006.

(51) Int. Cl.
- *G02B 1/04* (2006.01)
- *C08F 290/06* (2006.01)
- *G02C 7/04* (2006.01)

(52) U.S. Cl.
USPC ........................ 523/107; 523/106; 351/159.73

(58) Field of Classification Search
USPC ............................. 523/106, 107; 351/159.73
See application file for complete search history.

(56) References Cited

U.S. PATENT DOCUMENTS

| | | |
|---|---|---|
| 3,408,429 A | 10/1968 | Wichterle |
| 3,660,545 A | 5/1972 | Wichterle |
| 3,808,178 A | 4/1974 | Gaylord |
| 4,113,224 A | 9/1978 | Clark |
| 4,120,570 A | 10/1978 | Gaylord |
| 4,136,250 A | 1/1979 | Mueller |
| 4,153,641 A | 5/1979 | Deichert |
| 4,190,277 A | 2/1980 | England |
| 4,197,266 A | 4/1980 | Clark |
| 4,680,336 A | 7/1987 | Larsen et al. |
| 4,740,533 A | 4/1988 | Su |
| 5,006,622 A | 4/1991 | Kunzler |
| 5,034,461 A | 7/1991 | Lai |
| 5,070,215 A | 12/1991 | Bambury |

(Continued)

FOREIGN PATENT DOCUMENTS

| | | |
|---|---|---|
| EP | 080539 | 5/1986 |
| EP | 080539 | 7/1986 |

(Continued)

OTHER PUBLICATIONS

PCT International Search Report, dated May 7, 2008, for PCT Int'l. Appln. No. PCT/US2007/022341.

(Continued)

*Primary Examiner* — Michael Pepitone
(74) *Attorney, Agent, or Firm* — Karen A. Harding

(57) ABSTRACT

The present invention is a process for forming ophthalmic devices such as contact lenses, comprising the steps of curing a reactive mixture comprising at least one silicone-containing component, at least one hydrophilic component and at least one protonated diluent or protonatable diluent having a Hansen solubility parameter, δp between about 2 and about 7 to form an ophthalmic device having an advancing contact angle of less than about 80°; contacting the ophthalmic device with an aqueous solution which is capable of changing the Hansen solubility parameter, δp of the protonated or protonatable co-diluent to enhance water solubility and removing said diluent(s) with said aqueous solution.

24 Claims, 1 Drawing Sheet

(56) References Cited

U.S. PATENT DOCUMENTS

| | | | |
|---|---|---|---|
| 5,244,981 A | 9/1993 | Seidner | |
| 5,256,751 A | 10/1993 | Vanderlaan | |
| 5,311,223 A | 5/1994 | Vanderlaan | |
| 5,314,960 A | 5/1994 | Spinelli | |
| 5,321,108 A | 6/1994 | Kunzler | |
| 5,331,067 A | 7/1994 | Seidner | |
| 5,371,147 A | 12/1994 | Spinelli | |
| 5,387,662 A | 2/1995 | Kunzler | |
| 5,539,016 A | 7/1996 | Kunzler | |
| 6,367,929 B1* | 4/2002 | Maiden et al. | 351/159.33 |
| 2002/0016383 A1 | 2/2002 | Iwata | |
| 2002/0193559 A1 | 12/2002 | Ford et al. | |
| 2005/0154080 A1 | 7/2005 | McCabe et al. | |
| 2005/0179862 A1 | 8/2005 | Steffen et al. | |
| 2006/0072069 A1* | 4/2006 | Laredo et al. | 351/160 H |
| 2007/0138692 A1* | 6/2007 | Ford et al. | 264/236 |

FOREIGN PATENT DOCUMENTS

| | | |
|---|---|---|
| JP | 2006519907 A | 8/2006 |
| WO | WO 96/31792 | 10/1996 |
| WO | WO 03/022321 | 3/2003 |
| WO | WO 03/022322 | 3/2003 |
| WO | WO 2004/081105 A2 | 9/2004 |
| WO | WO 2004081105 A2 | 9/2004 |
| WO | WO 2005092987 A1 | 10/2005 |
| WO | WO 2006039466 A1 | 4/2006 |

OTHER PUBLICATIONS

U.S. Appl. No. 60/863,710, Johnson & Johnson Vision Care, Inc.

Volume III, Photoinitiators for Free Radical Cationic & Anionic Photopolymerization, $2^{nd}$ Edition by J.V. Crivello & K. Dietliker; edited by G. Bradley, pp. 275-298; John Wiley and Sons; New York; 1998.

Barton, CRC Handbook of Solubility Par., 1st. Ed. 1983, p. 85-87 and using Tables 13, 14.

Encyclopedia of Polymer Science and Engineering, N-Vinyl Amide Polymers, Second edition, vol. 17, pp. 198-257, John Wiley & Sons Inc.

* cited by examiner

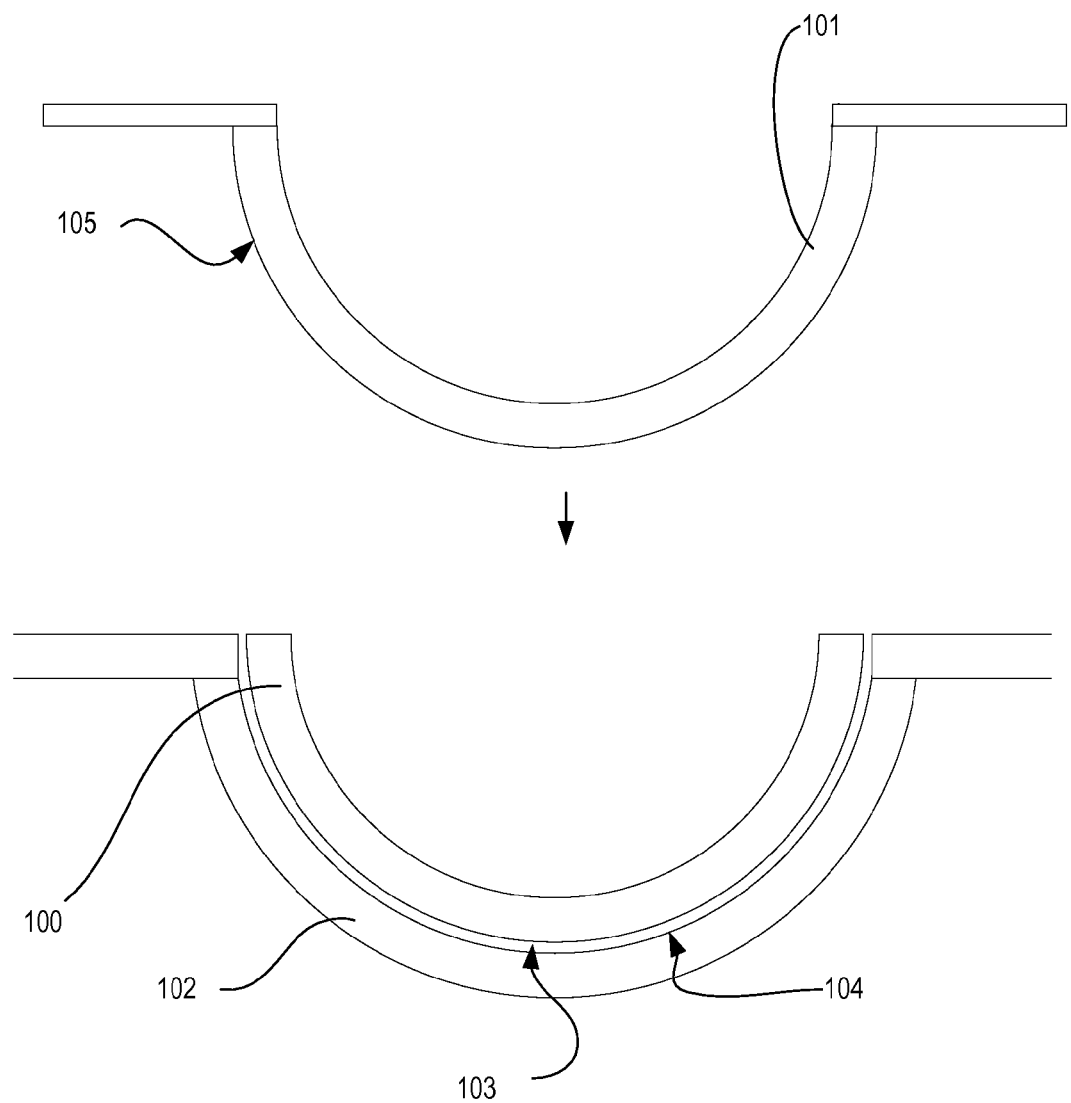

PROCESS FOR FORMING CLEAR, WETTABLE SILICONE HYDROGEL ARTICLES

RELATED APPLICATIONS

This application claims priority from U.S. provisional application Ser. No. 60/863,710, filed Oct. 31, 2006 which is incorporated by reference in its entirety.

FIELD OF THE INVENTION

The present invention relates to processes for forming molded articles and particularly medical devices such as contact lenses. More particularly, the present invention relates to a novel class of diluents, which allow the formation of compatible blends (and ultimately articles) comprising hydrophilic component(s) and silicone-containing component(s).

BACKGROUND OF THE INVENTION

Silicone hydrogels have been prepared by polymerizing mixtures containing at least one silicone containing monomer and at least one hydrophilic monomer. Either the silicone containing monomer or the hydrophilic monomer may function as a crosslinking agent or a separate crosslinking agent may be employed. Various alcohols, including n-hexanol, ethanol, and n-nonanol have been used as diluents to compatibilize the silicone monomers and the hydrophilic monomers. However, the articles made from these components and diluents either did not form clear articles or were not sufficiently wettable to be used without a coating.

Primary and secondary alcohols having more than four carbon atoms have also been disclosed to be useful as diluents for silicone containing hydrogels. However, many of these diluents do not form clear, wettable articles when internal wetting agents are included in the reaction mixture. While these diluents are useful, many require an additional compatibilizing component to produce uncoated clear, wettable molded articles.

Compounds having specific Hansen solubility parameters and Kamlet alpha values have also been disclosed to be useful as diluents for silicone hydrogels. However, many are not miscible with water, requiring the use of complicated solvent and water exchange processes. Thus, there still remains a need in the art for silicone hydrogels which are polymerized in an economic and efficient way which may yield medical devices such as uncoated clear contact lenses with wettable surfaces.

SUMMARY OF THE INVENTION

The present invention relates to a process comprising the steps of curing a reactive mixture comprising at least one silicone-containing component, at least one hydrophilic component and at least one protonated diluent or protonatable diluent having a Hansen solubility parameter, $\delta p$ between about 2 and about 7 to form an ophthalmic device having an advancing contact angle of less than about 80°; contacting the ophthalmic device with an aqueous solution which is capable of changing the Hansen solubility parameter, $\delta p$ of the protonated or protonatable co-diluent to enhance water solubility and removing said diluent(s) with said aqueous solution.

The present invention further relates to a process comprising the steps of reacting a reactive mixture comprising at least one silicone-containing component, at least one hydrophilic component, and at least one protonated diluent or protonatable diluent, to form an ophthalmic device having an advancing contact angle of less than about 80°; and contacting the ophthalmic device with an exchange solution which is capable of changing the Hansen solubility parameter, $\delta p$ of the protonated or protonatable diluent above water solubility.

Still further the present invention relates to methods for manufacturing devices, specifically ophthalmic devices and more specifically contact lenses and the articles so made.

DESCRIPTION OF THE FIGURE

FIG. 1 is a diagram of an ophthalmic lens and mold parts used to form the ophthalmic lens.

DETAILED DESCRIPTION OF THE SPECIFIC EMBODIMENTS

The present invention relates to compositions comprising at least one hydrophilic component, at least one silicone-containing component, and at least one diluent, which is capable of compatibilizing the components and being processed using only aqueous solutions.

As used herein, "diluent" refers to a diluent for the reactive composition. Diluents do not react to form part of the biomedical devices.

As used herein, "compatibilizing agent" means a compound, which is capable of solubilizing the selected reactive components. In one embodiment compatibilizing agents have a number average molecular weight of about less than 5000 Daltons, and in another less than about 3000 Daltons. The compatibilizing agent of the present invention solubilizes via hydrogen bonding, dispersive forces, combinations thereof and the like. Thus, any functionality which interacts in any of these ways with the high molecular weight hydrophilic polymer may be used as a compatibilizing agent. Compatibilizing agents in the present invention may be used in an amount so long as they do not degrade other desirable properties of the resulting ophthalmic device. The amount will depend in part on the amount of high molecular weight hydrophilic polymer used. One class of compatibilizing agents comprise at least one silicone and at least one hydroxyl group. Such components are referred to as "silicone containing compatibilizing component" and have been disclosed in WO03/022321 and WO03/022322.

As used herein, a "biomedical device" is any article that is designed to be used while either in or on mammalian tissues or fluid, and in one embodiment in or on human tissue or fluids. Examples of these devices include but are not limited to catheters, implants, stents, and ophthalmic devices such as intraocular lenses, punctal plugs and contact lenses. In one embodiment the biomedical devices are ophthalmic devices, particularly contact lenses, most particularly contact lenses made from silicone hydrogels.

As used herein, the terms "lens" and "ophthalmic device" refer to devices that reside in or on the eye. These devices can provide optical correction, wound care, drug delivery, diagnostic functionality, cosmetic enhancement or effect or a combination of these properties. The term lens (or contact lens) includes but is not limited to soft contact lenses, hard contact lenses, intraocular lenses, overlay lenses, ocular inserts, and optical inserts.

All percentages in this specification are weight percentages unless otherwise noted.

As used herein, the phrase "without a surface treatment" or "not surface treated" means that the exterior surfaces of the devices of the present invention are not separately treated to improve the wettability of the device. Treatments which may be foregone because of the present invention include, plasma treatments, grafting, coating and the like. However, coatings which provide properties other than improved wettability, such as, but not limited to antimicrobial coatings and the application of color or other cosmetic enhancement, may be applied to devices of the present invention.

Without being limited to this mechanism, it is believed that the nature of the diluent may play a role in delineating how the components copolymerize. Diluents may affect the solubility and aggregation characteristics of some monomers and may influence reactivity ratios.

It has been found that by including at least one diluent comprising at least one abstractable proton (protonated diluents) in the reactive mixture, the advancing contact angle of the resulting device may be lowered and lower contact angles may be achieved with better repeatability. In their protonated form these protonated diluents are non-polar and can readily solubilize both hydrophilic and hydrophobic reactive components in the reactive mixture, which contributes to forming polymers displaying advancing contact angles less than about 80 and in some embodiments, less than about 75°. The protonated diluents have relatively poor water solubility, which makes aqueous processing of the devices cumbersome. However, the protonated diluents may be deprotonated. These deprotonated diluents have greatly enhanced water solubility and can be removed via aqueous processing. Thus, the protonated diluents have low δp values in the reactive mixture, but are readily deprotonated to allow for solubility in aqueous processing solutions at processing conditions.

Examples of protonated diluents include carboxylic acids having 6 to 18 carbon atoms, and phenols substituted with $C_{6-10}$ alkyl groups. In one embodiment the protonated diluent is selected from decanoic acid, hexanoic acid, octanoic acid, dodecanoic acid, mixtures thereof and the like. Alternatively, protonatable diluents, (diluents which can accept a proton) such as amines having 6-14 carbon atoms may be used. The protonatable diluents are included in the reactive mixture in their deprotonated form and protonated during lens processing. Examples of suitable protonatable diluents include decylamine, octylamine, hexylamine, mixtures thereof and the like.

Co-diluents may also be used. The co-diluents useful in the present invention should be relatively non-polar. The selected co-diluent should have a polarity sufficiently low to solubilize the non-polar components in the reactive mixture at reaction conditions, but sufficient water solubility to allow diluent exchange using aqueous solutions. One way to characterize the polarity of the co-diluents of the present invention is via the Hansen solubility parameter, δp. In certain embodiments, the δp of the co-diluents of the present invention is about 2 to about 7.

The selected diluents (co-diluents and the protonated or protonatable diluents) should also solubilize the components in the reactive mixture. It will be appreciated that the properties of the selected hydrophilic and hydrophobic components may affect the properties of the diluents which will provide the desired compatibilization. For example, if the reaction mixture contains only moderately polar components, diluents having moderate δp may be used. If however, the reaction mixture contains strongly polar components, the diluent may need to have a high δp.

Specific co-diluents which may be used include, without limitation, diisopropylaminoethanol, dipropylene glycol methyl ether, 1-octanol, 1-pentanol, 2-pentanol, 1-hexanol, 2-hexanol, 2-octanol, 3-methyl-3-pentanol, tert-amyl alcohol, tert-butanol, 2-butanol, 1-butanol, 2-methyl-2-pentanol, 2-propanol, 1-propanol, ethanol, 2-ethyl-1-butanol, 1-tert-butoxy-2-propanol, 3,3-dimethyl-2-butanol, tert-butoxyethanol, tripropylene glycol methyl ether, 2-(diisopropylamino) ethanol, 1-ethoxy-2-propanol, mixtures thereof and the like.

Classes of suitable co-diluents include, without limitation, alcohols having 2 to 20 carbons and a carbon: oxygen from hydroxyl ratio of up to about 8:about 1, amides having 10 to 20 carbon atoms derived from primary amines. In some embodiments, primary and tertiary alcohols are preferred. In one embodiment alcohols having 5 to 20 carbons having a carbon: oxygen from hydroxyl ratio of about 3:about 1 to about 6:about 1 may be use as co-diluents.

Examples of suitable co-diluents for one embodiment include, tripropylene glycol methyl ether, 1-octanol, 1-pentanol, 1-hexanol, 2-hexanol, 2-octanol, 3-methyl-3-pentanol, 2-pentanol, t-amyl alcohol, tert-butanol, 2-butanol, 1-butanol, 2-methyl-2-pentanol, 2-ethyl-1-butanol, ethanol, 3,3-dimethyl-2-butanol, mixtures thereof and the like.

In yet another embodiment, suitable co-diluents include tripropylene glycol methyl ether, 1-pentanol, 3-methyl-3-pentanol, 1-pentanol, 2-pentanol, t-amyl alcohol, tert-butanol, 2-butanol, 1-butanol, 2-methyl-2-pentanol, 2-ethyl-1-butanol, 3,3-dimethyl-2-butanol, 2-octyl-1-dodecanol, mixtures thereof and the like.

Mixtures of diluents may be used.

In some embodiments the reactive mixture comprises at least one co-diluent and at least one protonated or protonatable diluent. In these embodiments the protonated or protonatable diluent may comprise up to about 65 wt % of the diluent mixture and in some embodiments between about 25 and about 45 wt % of the diluent mixture.

The diluents (co-diluent(s) and protonated or protonatable diluent(s)) may be used in amounts up to about 55% by weight of the total of all components in the reactive mixture. In one embodiment the diluent(s) are used in amounts less than about 50% and in another in amounts between about 30 and about 45% by weight of the total of all components in the reactive mixture. It has been surprisingly found that when the diluents of the present invention are used, wettable biomedical devices, and particularly wettable ophthalmic devices, may be made, even when aqueous processing conditions are employed.

The one or more silicone-containing components and one or more hydrophilic components used to make the polymer of this invention can be any of the known components used in the prior art to make silicone hydrogels. These terms silicone-containing component and hydrophilic component are not mutually exclusive, in that, the silicone-containing component can be somewhat hydrophilic and the hydrophilic component can comprise some silicone, because the silicone-containing component can have hydrophilic groups and the hydrophilic components can have silicone groups.

A silicone-containing component is one that contains at least one [—Si—O—Si] group, in a monomer, macromer or prepolymer. In one embodiment, the Si and attached O are present in the silicone-containing component in an amount greater than 20 weight percent, and in another embodiment greater than 30 weight percent of the total molecular weight of the silicone-containing component. Useful silicone-containing components comprise polymerizable functional groups such as acrylate, methacrylate, acrylamide, methacrylamide, N-vinyl lactam, N-vinylamide, and styryl functional groups. Examples of silicone-containing components which are useful in this invention may be found in U.S. Pat. Nos. 3,808,178; 4,120,570; 4,136,250; 4,153,641; 4,740,533; 5,034,461 and 5,070,215, and EP080539. All of the patents cited herein are hereby incorporated in their entireties by reference. These references disclose many examples of olefinic silicone-containing components.

A "silicone-containing component" is one that contains at least one [—Si—O—] unit in a monomer, macromer or prepolymer. In one embodiment, the total Si and attached O are present in the silicone-containing component in an amount greater than about 20 weight percent, and in another embodiment greater than 30 weight percent of the total molecular weight of the silicone-containing component. Useful silicone-containing components comprise polymerizable functional groups such as acrylate, methacrylate, acrylamide, methacrylamide, vinyl, N-vinyl lactam, N-vinylamide, and styryl functional groups. Examples of silicone-containing components which are useful in this invention may be found in U.S. Pat. Nos. 3,808,178; 4,120,570; 4,136,250; 4,153,641; 4,740,533; 5,034,461 and 5,070,215, and EP080539. These references disclose many examples of olefinic silicone-containing components.

Suitable silicone-containing components include compounds of Formula I

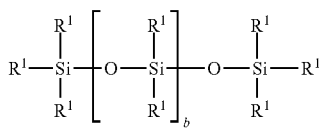

where $R^1$ is independently selected from monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof, and monovalent siloxane chains comprising 1-100 Si—O repeat units which may further comprise functionality selected from alkyl, hydroxy, amino, oxa, carboxy, alkyl carboxy, alkoxy, amido, carbamate, halogen or combinations thereof, where b=0 to 500, where it is understood that when b is other than 0, b is a distribution having a mode equal to a stated value;

wherein at least one $R^1$ comprises a monovalent reactive group, and in some embodiments between one and 3 $R^1$ comprise monovalent reactive groups.

As used herein "monovalent reactive groups" are groups that can undergo free radical and/or cationic polymerization. Non-limiting examples of free radical reactive groups include (meth)acrylates, styryls, vinyls, vinyl ethers, $C_{1-6}$alkyl(meth)acrylates, (meth)acrylamides, $C_{1-6}$alkyl(meth)acrylamides, N-vinyllactams, N-vinylamides, $C_{2-12}$alkenyls, $C_{2-12}$alkenylphenyls, $C_{2-12}$alkenylnaphthyls, $C_{2-6}$alkenylphenylC$_{1-6}$alkyls, O-vinylcarbamates and O-vinylcarbonates. Non-limiting examples of cationic reactive groups include vinyl ethers or epoxide groups and mixtures thereof. In one embodiment the free radical reactive groups comprises (meth)acrylate, acryloxy, (meth)acrylamide, and mixtures thereof.

Suitable monovalent alkyl and aryl groups include unsubstituted monovalent $C_1$ to $C_{16}$alkyl groups, $C_6$-$C_{14}$ aryl groups, such as substituted and unsubstituted methyl, ethyl, propyl, butyl, 2-hydroxypropyl, propoxypropyl, polyethyleneoxypropyl, combinations thereof and the like.

In one embodiment b is zero, one $R^1$ is a monovalent reactive group, and at least 3 $R^1$ are selected from monovalent alkyl groups having one to 16 carbon atoms, and in another embodiment from monovalent alkyl groups having one to 6 carbon atoms. Non-limiting examples of silicone components of this embodiment include 2 methyl-,2-hydroxy-3-[3-[1,3,3,3-tetramethyl-1-[(trimethylsilyl)oxy]disiloxanyl]propoxy]propyl ester ("SiGMA"), 2-hydroxy-3-methacryloxypropyloxypropyl-tris(trimethylsiloxy)silane,
3-methacryloxypropyltris(trimethylsiloxy)silane ("TRIS"),
3-methacryloxypropylbis(trimethylsiloxy)methylsilane and
3-methacryloxypropylpentamethyl disiloxane.

In another embodiment, b is 2 to 20, 3 to 15 or in some embodiments 3 to 10; at least one terminal $R^1$ comprises a monovalent reactive group and the remaining $R^1$ are selected from monovalent alkyl groups having 1 to 16 carbon atoms, and in another embodiment from monovalent alkyl groups having 1 to 6 carbon atoms. In yet another embodiment, b is 3 to 15, one terminal $R^1$ comprises a monovalent reactive group, the other terminal $R^1$ comprises a monovalent alkyl group having 1 to 6 carbon atoms and the remaining $R^1$ comprise monovalent alkyl group having 1 to 3 carbon atoms. Non-limiting examples of silicone components of this embodiment include (mono-(2-hydroxy-3-methacryloxypropyl)-propyl ether terminated polydimethylsiloxane (400-1000 MW)) ("OH-mPDMS"), monomethacryloxypropyl terminated mono-n-butyl terminated polydimethylsiloxanes (800-1000 MW), ("mPDMS").

In another embodiment b is 5 to 400 or from 10 to 300, both terminal $R^1$ comprise monovalent reactive groups and the remaining $R^1$ are independently selected from monovalent alkyl groups having 1 to 18 carbon atoms which may have ether linkages between carbon atoms and may further comprise halogen.

In another embodiment, one to four $R^1$ comprises a vinyl carbonate or carbamate of the formula:

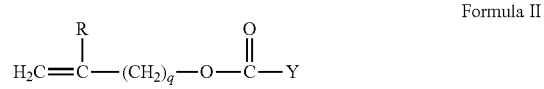

Formula II wherein: Y denotes O—, S— or NH—;
R denotes, hydrogen or methyl; d is 1, 2, 3 or 4; and q is 0 or 1.

The silicone-containing vinyl carbonate or vinyl carbamate monomers specifically include: 1,3-bis[4-(vinyloxycarbonyloxy)but-1-yl]tetramethyl-disiloxane; 3-(vinyloxycarbonylthio) propyl-[tris (trimethylsiloxy)silane]; 3-[tris (trimethylsiloxy)silyl]propyl allyl carbamate; 3-[tris (trimethylsiloxy)silyl] propyl vinyl carbamate; trimethylsilylethyl vinyl carbonate; trimethylsilylmethyl vinyl carbonate, and

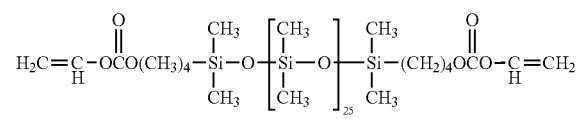

Where biomedical devices with modulus below about 200 are desired, only one $R^1$ shall comprise a monovalent reactive group and no more than two of the remaining $R^1$ groups will comprise monovalent siloxane groups.

In one embodiment, where a silicone hydrogel lens is desired, the lens of the present invention will be made from a reactive mixture comprising at least about 20 weight % and in some embodiments between about 20 and 70% wt silicone-containing components based on total weight of reactive monomer components from which the polymer is made.

Another class of silicone-containing components includes polyurethane macromers of the following formulae:

Formulae IV-VI $$(*D*A*D*G)_a*D*D*E^1;$$

$$E(*D*G*D*A)_a*D*G*D*E^1 \text{ or;}$$

$$E(*D*A*D*G)_a*D*A*D*E^1$$

wherein:
D denotes an alkyl diradical, an alkyl cycloalkyl diradical, a cycloalkyl diradical, an aryl diradical or an alkylaryl diradical having 6 to 30 carbon atoms,
G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;
* denotes a urethane or ureido linkage;
$a$ is at least 1;
A denotes a divalent polymeric radical of formula:

Formula VII

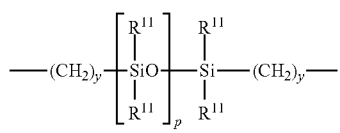

$R^{11}$ independently denotes an alkyl or fluoro-substituted alkyl group having 1 to 10 carbon atoms which may contain ether linkages between carbon atoms; y is at least 1; and p provides a moiety weight of 400 to 10,000; each of E and $E^1$ independently denotes a polymerizable unsaturated organic radical represented by formula:

Formula VIII

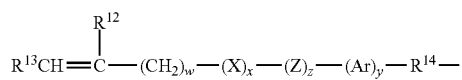

wherein: $R^{12}$ is hydrogen or methyl; $R^{13}$ is hydrogen, an alkyl radical having 1 to 6 carbon atoms, or a —CO—Y—$R^{15}$ radical wherein Y is —O—, Y—S— or —NH—; $R^{14}$ is a divalent radical having 1 to 12 carbon atoms; X denotes —CO— or —OCO—; Z denotes —O— or —NH—; Ar denotes an aromatic radical having 6 to 30 carbon atoms; w is 0 to 6; x is 0 or 1; y is 0 or 1; and z is 0 or 1.

In one embodiment the silicone-containing component comprises a polyurethane macromer represented by the following formula:

Formula IX

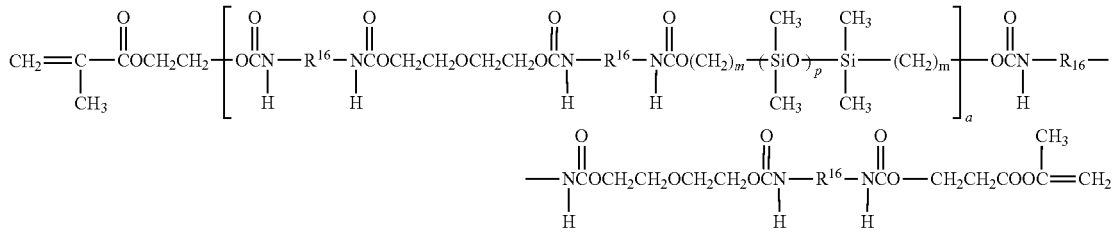

wherein $R^{16}$ is a diradical of a diisocyanate after removal of the isocyanate group, such as the diradical of isophorone diisocyanate. Another suitable silicone containing macromer is compound of formula X (in which x+y is a number in the range of 10 to 30) formed by the reaction of fluoroether, hydroxy-terminated polydimethylsiloxane, isophorone diisocyanate and isocyanatoethylmethacrylate.

Formula X

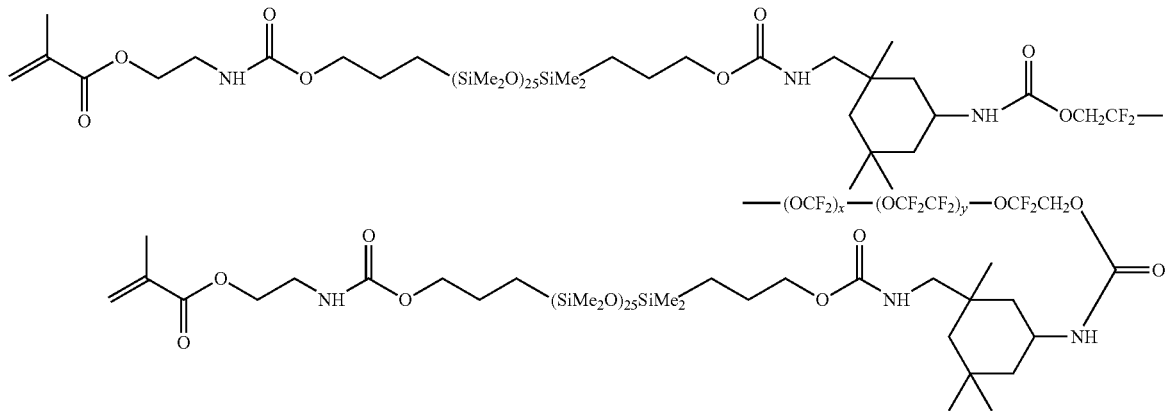

Other silicone-containing components suitable for use in this invention include those described is WO 96/31792 such as macromers containing polysiloxane, polyalkylene ether, diisocyanate, polyfluorinated hydrocarbon, polyfluorinated ether and polysaccharide groups. Another class of suitable silicone-containing components include silicone containing macromers made via GTP, such as those disclosed in U.S. Pat. Nos. 5,314,960, 5,331,067, 5,244,981, 5,371,147 and 6,367, 929. U.S. Pat. Nos. 5,321,108; 5,387,662 and 5,539,016 describe polysiloxanes with a polar fluorinated graft or side group having a hydrogen atom attached to a terminal difluoro-substituted carbon atom. US 2002/0016383 describe hydrophilic siloxanyl methacrylates containing ether and siloxanyl linkanges and crosslinkable monomers containing polyether and polysiloxanyl groups. Any of the foregoing polysiloxanes can also be used as the silicone-containing component in this invention.

Hydrophilic components include those which are capable of providing at least about 20% and in some embodiments at least about 25% water content to the resulting lens when combined with the remaining reactive components. Suitable hydrophilic components include hydrophilic monomers, prepolymers and polymers and may be present in amounts between about 10 to about 60 weight % based upon the weight of all reactive components, in some embodiments about 15 to about 50 weight %, and in other embodiments between about 20 to about 40 weight %. The hydrophilic monomers that may be used to make the polymers of this invention have at least one polymerizable double bond and at least one hydrophilic functional group. Examples of polymerizable double bonds include acrylic, methacrylic, acrylamido, methacrylamido, fumaric, maleic, styryl, isopropenylphenyl, O-vinylcarbonate, O-vinylcarbamate, allylic, O-vinylacetyl and N-vinyllactam and N-vinylamido double bonds. Such hydrophilic monomers may themselves be used as crosslinking agents. "Acrylic-type" or "acrylic-containing" monomers are those monomers containing the acrylic group (CR'H═CRCOX) wherein R is H or CH$_3$, R' is H, alkyl or carbonyl, and X is O or N, which are also known to polymerize readily, such as N,N-dimethylacrylamide (DMA), 2-hydroxyethyl acrylate, glycerol methacrylate, 2-hydroxyethyl methacrylamide, polyethyleneglycol monomethacrylate, methacrylic acid, acrylic acid and mixtures thereof.

Hydrophilic vinyl-containing monomers which may be incorporated into the hydrogels of the present invention include monomers such as N-vinyl lactams (e.g. N-vinyl pyrrolidone (NVP)), N-vinyl-N-methyl acetamide, N-vinyl-N-ethyl acetamide, N-vinyl-N-ethyl formamide, N-vinyl formamide, N-2-hydroxyethyl vinyl carbamate, N-carboxy-β-alanine N-vinyl ester, with NVP being preferred in one embodiment.

Other hydrophilic monomers that can be employed in the invention include polyoxyethylene polyols having one or more of the terminal hydroxyl groups replaced with a functional group containing a polymerizable double bond. Examples include polyethylene glycol with one or more of the terminal hydroxyl groups replaced with a functional group containing a polymerizable double bond. Examples include polyethylene glycol reacted with one or more molar equivalents of an end-capping group such as isocyanatoethyl methacrylate ("IEM"), methacrylic anhydride, methacryloyl chloride, vinylbenzoyl chloride, or the like, to produce a polyethylene polyol having one or more terminal polymerizable olefinic groups bonded to the polyethylene polyol through linking moieties such as carbamate or ester groups.

Still further examples are the hydrophilic vinyl carbonate or vinyl carbamate monomers disclosed in U.S. Pat. No. 5,070,215, and the hydrophilic oxazolone monomers disclosed in U.S. Pat. No. 4,190,277. Other suitable hydrophilic monomers will be apparent to one skilled in the art.

In one embodiment the hydrophilic monomers which may be incorporated into the polymer of the present invention include hydrophilic monomers such as N,N-dimethyl acrylamide (DMA), 2-hydroxyethyl acrylate, glycerol methacrylate, 2-hydroxyethyl methacrylamide, N-vinylpyrrolidone (NVP), N-vinyl methacrylamide, HEMA, and polyethyleneglycol monomethacrylate.

In another embodiment the hydrophilic monomers include DMA, NVP, HEMA and mixtures thereof.

The reactive mixtures of the present invention may also comprise as hydrophilic components one or more hydrophilic polymer(s). As used herein, hydrophilic polymer refers to substances having a weight average molecular weight of no less than about 5,000 Daltons, wherein said substances upon incorporation to silicone hydrogel formulations, increase the wettability of the cured silicone hydrogels. In one embodiment the weight average molecular weight of these hydrophilic polymers is greater than about 30,000; in another between about 150,000 to about 2,000,000 Daltons, in yet another between about 300,000 to about 1,800,000 Daltons, and in yet another about 500,000 to about 1,500,000 Daltons.

Alternatively, the molecular weight of hydrophilic polymers of the invention can be also expressed by the K-value, based on kinematic viscosity measurements, as described in Encyclopedia of Polymer Science and Engineering, N-Vinyl Amide Polymers, Second edition, Vol 17, pgs. 198-257, John Wiley & Sons Inc. When expressed in this manner, hydrophilic monomers having K-values of greater than about 46 and in one embodiment between about 46 and about 150. The hydrophilic polymers are present in the formulations of these devices in an amount sufficient to provide contact lenses and provide at least a 10% improvement in wettability and in some embodiments provide wettable lenses without surface treatments. For a contact lens, "wettable" is a lens which displays an advancing dynamic contact angle of less than about 80°, less than 70° and in some embodiments less than about 60°.

Suitable amounts of hydrophilic polymer include from about 1 to about 20 weight percent, in some embodiments about 5 to about 17 percent, in other embodiments about 6 to about 15 percent, all based upon the total of all reactive components.

Examples of hydrophilic polymers include but are not limited to polyamides, polylactones, polyimides, polylactams and functionalized polyamides, polylactones, polyimides, polylactams, such as DMA functionalized by copolymerizing DMA with a lesser molar amount of a hydroxyl-functional monomer such as HEMA, and then reacting the hydroxyl groups of the resulting copolymer with materials containing radical polymerizable groups, such as isocyanatoethylmethacrylate or methacryloyl chloride. Hydrophilic prepolymers made from DMA or n-vinyl pyrrolidone with glycidyl methacrylate may also be used. The glycidyl methacrylate ring can be opened to give a diol which may be used in conjunction with other hydrophilic prepolymer in a mixed system to increase the compatibility of the hydrophilic polymer, hydroxyl-functionalized silicone containing monomer and any other groups which impart compatibility. In one embodiment the hydrophilic polymers contain at least one cyclic moiety in their backbone, such as but not limited to, a cyclic amide or cyclic imide. Hydrophilic polymers include but are not limited to poly-N-vinyl pyrrolidone, poly-N-vinyl-2-piperidone, poly-N-vinyl-2-caprolactam, poly-N-vinyl-3-methyl-2-caprolactam, poly-N-vinyl-3-methyl-2-piperidone, poly-N-vinyl-4-methyl-2-piperidone, poly-N-vinyl-4-methyl-2-caprolactam, poly-N-vinyl-3-ethyl-2-pyrrolidone, and poly-N-vinyl-4,5-dimethyl-2-pyrrolidone, polyvinylimidazole, poly-N—N-dimethylacrylamide, polyvinyl alcohol, polyacrylic acid, polyethylene-oxide, poly-2-ethyl-oxazoline, heparin polysaccharides, polysaccharides, mixtures and copolymers (including block or random, branched, multichain, comb-shaped or star shaped) thereof, where poly-N-vinylpyrrolidone (PVP) is particularly preferred in one embodiment. Copolymers might also be used such as graft copolymers of PVP.

The hydrophilic polymers provide improved wettability, and particularly improved in vivo wettability to the medical devices of the present invention. Without being bound by any theory, it is believed that the hydrophilic polymers are hydrogen bond receivers which in aqueous environments, hydrogen bond to water, thus becoming effectively more hydrophilic. The absence of water facilitates the incorporation of the hydrophilic polymer in the reaction mixture. Aside from the specifically named hydrophilic polymers, it is expected that any hydrophilic polymer will be useful in this invention provided that when said polymer is added to a silicone hydrogel formulation, the hydrophilic polymer (a) does not substantially phase separate from the reaction mixture and (b) imparts wettability to the resulting cured polymer. In some embodiments it is preferred that the hydrophilic polymer be soluble in the diluent at reaction temperatures.

Compatibilizing agents may also be used. In some embodiments the compatibilizing component may be any functionalized silicone containing monomer, macromer or prepolymer which, when polymerized and/or formed into a final article is compatible with the selected hydrophilic components. The compatibility test disclosed in WO03/022321 may be used to select suitable compatibilizing agents. In some embodiments, a silicone monomer, prepolymer or macromer which also comprises hydroxyl groups is included in the reaction mixture. Examples include 3-methacryloxy-2-hydroxypropyloxy)propylbis(trimethylsiloxy)methylsilane, mono-(3-methacryloxy-2-hydroxypropyloxy)propyl terminated, mono-butyl terminated polydimethylsiloxane (MW 1100), hydroxyl functionalized silicone containing GTP macromers, hydroxyl functionalized macromers comprising polydimethyl siloxanes, combinations thereof and the like.

In certain embodiments a hydroxyl containing component is also included. The hydroxyl containing component that may be used to make the polymers of this invention have at least one polymerizable double bond and at least one hydrophilic functional group. Examples of polymerizable double bonds include acrylic, methacrylic, acrylamido, methacrylamido, fumaric, maleic, styryl, isopropenylphenyl, O-vinylcarbonate, O-vinylcarbamate, allylic, O-vinylacetyl and N-vinyllactam and N-vinylamido double bonds. The hydroxyl containing component may also act as a crosslinking agent. In addition the hydroxyl containing component comprises a hydroxyl group. This hydroxyl group may be a primary, secondary or tertiary alcohol group, and may be located on an alkyl or aryl group. Examples of hydroxyl containing monomers that may be used include but are not limited to 2-hydroxyethyl methacrylate ("HEMA"), 2-hydroxyethyl acrylate, 2-hydroxyethyl methacrylamide, 2-hydroxyethyl acrylamide, N-2-hydroxyethyl vinyl carbamate, 2-hydroxyethyl vinyl carbonate, 2-hydroxypropyl methacrylate, hydroxyhexyl methacrylate, hydroxyoctyl methacrylate and other hydroxyl functional monomers as disclosed in U.S. Pat. Nos. 5,006,622; 5,070,215; 5,256,751 and 5,311,223. In some embodiments the hydrophilic components include 2-hydroxyethyl methacrylate. In certain embodiments, it is preferred to have at least 3 weight % HEMA, more preferred to have at least 5 weight % HEMA, and most preferred to have at least 6 weight % HEMA in the reactive mixture.

It is generally necessary to add one or more cross-linking agents, also referred to as cross-linking monomers, to the reaction mixture, such as ethylene glycol dimethacrylate ("EGDMA"), trimethylolpropane trimethacrylate ("TMPTMA"), glycerol trimethacrylate, polyethylene glycol dimethacrylate (wherein the polyethylene glycol preferably has a molecular weight up to, e.g., about 5000), and other polyacrylate and polymethacrylate esters, such as the end-capped polyoxyethylene polyols described above containing two or more terminal methacrylate moieties. The cross-linking agents are used in the usual amounts, e.g., from about 0.000415 to about 0.0156 mole per 100 grams of reactive components in the reaction mixture. (The reactive components are everything in the reaction mixture except the diluent and any additional processing aids which do not become part of the structure of the polymer.) Alternatively, if the hydrophilic monomers and/or the silicone containing monomers act as the cross-linking agent, the addition of a crosslinking agent to the reaction mixture is optional. Examples of hydrophilic monomers which can act as the crosslinking agent and when present do not require the addition of an additional crosslinking agent to the reaction mixture include polyoxyethylene polyols described above containing two or more terminal methacrylate moieties.

An example of a silicone containing monomer which can act as a crosslinking agent and, when present, does not require the addition of a crosslinking monomer to the reaction mixture includes α,ω-bismethacryloypropyl polydimethylsiloxane.

The reactive mixture may contain additional components such as, but not limited to, UV absorbers, medicinal agents, antimicrobial compounds, reactive tints, pigments, copolymerizable and nonpolymerizable dyes, release agents and combinations thereof. A polymerization catalyst is preferably included in the reaction mixture. The polymerization initiators include compounds such as lauryl peroxide, benzoyl peroxide, isopropyl percarbonate, azobisisobutyronitrile, and the like, that generate free radicals at moderately elevated temperatures, and photoinitiator systems such as aromatic alpha-hydroxy ketones, alkoxyoxybenzoins, acetophenones, acylphosphine oxides, bisacylphosphine oxides, and a tertiary amine plus a diketone, mixtures thereof and the like. Illustrative examples of photoinitiators are 1 hydroxycyclohexyl phenyl ketone, 2-hydroxy-2-methyl-1-phenyl-propan-1-one, bis(2,6-dimethoxybenzoyl)-2,4-4-trimethylpentyl phosphine oxide (DMBAPO), bis(2,4,6-trimethylbenzoyl)-phenyl phosphineoxide (Irgacure 819), 2,4,6-trimethylbenzyldiphenyl phosphine oxide and 2,4,6-trimethylbenzoyl diphenylphosphine oxide, benzoin methyl ester and a combination of camphorquinone and ethyl 4-(N,N-dimethylamino) benzoate. Commercially available visible light initiator systems include Irgacure 819, Irgacure 1700, Irgacure 1800, Irgacure 819, Irgacure 1850 (all from Ciba Specialty Chemicals) and Lucirin TPO initiator (available from BASF). Commercially available UV photoinitiators include Darocur 1173 and Darocur 2959 (Ciba Specialty Chemicals). These and other photoinitiators which may be used are disclosed in Volume III, Photoinitiators for Free Radical Cationic & Anionic Photopolymerization, $2^{nd}$ Edition by J. V. Crivello & K. Dietliker; edited by G. Bradley; John Wiley and Sons; New York; 1998, which is incorporated herein by reference. The initiator is used in the reaction mixture in effective amounts to initiate photopolymerization of the reaction mixture, e.g., from about 0.1 to about 2 parts by weight per 100 parts of reactive monomer. Polymerization of the reaction mixture can be initiated using the appropriate choice of heat or visible or ultraviolet light or other means depending on the polymerization initiator used. Alternatively, initiation can be conducted without a photoinitiator using, for example, e-beam. However, in one embodiment when a photoinitiator is used, preferred initiators induce bisacylphosphine oxides, such as bis(2,4,6-trimethylbenzoyl)-phenyl phosphine oxide (Irgacure 819®) or a combination of 1-hydroxycyclohexyl phenyl ketone and bis(2,6-dimethoxybenzoyl)-2,4-4-trimethylpentyl phosphine oxide (DMBAPO), and a preferred method of polymerization initiation is visible light. A preferred is bis(2, 4,6-trimethylbenzoyl)-phenyl phosphine oxide (Irgacure 819®).

The range of silicone-containing component(s) present in the reaction mixture is from about 5 to 95 weight percent, in some embodiments about 30 to 85 weight percent, and in other embodiments about 45 to 75 weight percent of the reactive components in the reaction mixture. Suitable ranges of hydrophilic component(s) present in the above invention include from about 5 to 80 weight percent, from about 10 to 60 weight percent, and in some embodiments from about 20 to 50 weight percent of the reactive components in the reaction mixture.

Combinations of reactive components and diluents include those having from about 25 to about 65 weight % silicone containing monomer, about 15 to about 40 weight % hydrophilic monomer, from about 5 to about 65 weight % of an hydroxyl containing component, from about 0.2 to about 3 weight % of a crosslinking monomer, from about 0 to about 3 weight % of a UV absorbing monomer, from about 5 to about 20 weight % of a hydrophilic polymer (all based upon the weight % of all reactive components) and about 20 to about 60 weight % (weight % of all components, both reactive and non-reactive) of one or more of the claimed diluents.

The reaction mixtures of the present invention can be formed by any of the methods known to those skilled in the art, such as shaking or stirring, and used to form polymeric articles or devices by known methods.

For example, the biomedical devices of the invention may be prepared by mixing reactive components and the diluent(s) with a polymerization initiator and curing by appropriate conditions to form a product that can be subsequently formed into the appropriate shape by lathing, cutting and the like. Alternatively, the reaction mixture may be placed in a mold and subsequently cured into the appropriate article.

Various processes are known for processing the reaction mixture in the production of contact lenses, including spincasting and static casting. Spincasting methods are disclosed in U.S. Pat. Nos. 3,408,429 and 3,660,545, and static casting methods are disclosed in U.S. Pat. Nos. 4,113,224 and 4,197, 266. In one embodiment, the method for producing contact lenses comprising the polymer of this invention is by the direct molding of the silicone hydrogels, which is economical, and enables precise control over the final shape of the hydrated lens. For this method, the reaction mixture is placed in a mold having the shape of the final desired silicone hydrogel i.e., water-swollen polymer, and the reaction mixture is subjected to conditions whereby the monomers polymerize, to thereby produce a polymer/diluent mixture in the shape of the final desired product.

Referring to FIG. 1, a diagram is illustrated of an ophthalmic lens 100, such as a contact lens, and mold parts 101-102 used to form the ophthalmic lens 100. In some embodiments, the mold parts include a back surface mold part 101 and a front surface mold part 102. As used herein, the term "front surface mold part" refers to the mold part whose concave surface 104 is a lens forming surface used to form the front surface of the ophthalmic lens. Similarly, the term "back surface mold part" refers to the mold part 101 whose convex surface 105 forms a lens forming surface, which will form the back surface of the ophthalmic lens 100. In some embodiments, mold parts 101 and 102 are of a concavo-convex shape, preferably including planar annular flanges, which surround the circumference of the uppermost edges of the concavo-convex regions of the mold parts 101-102.

Typically, the mold parts 101-102 are arrayed as a "sandwich". The front surface mold part 102 is on the bottom, with the concave surface 104 of the mold part facing upwards. The back surface mold part 101 can be disposed symmetrically on top of the front surface mold part 102, with the convex surface 105 of the back surface mold part 101 projecting partially into the concave region of the front surface mold part 102. In one embodiment, the back surface mold part 101 is dimensioned such that the convex surface 105 thereof engages the outer edge of the concave surface 104 of the front mold part 102 throughout its circumference, thereby cooperating to form a sealed mold cavity in which the ophthalmic lens 100 is formed.

In some embodiments, the mold parts 101-102 are fashioned of thermoplastic and are transparent to polymerization-initiating actinic radiation, by which is meant that at least some, and in some embodiments all, radiation of an intensity and wavelength effective to initiate polymerization of the reaction mixture in the mold cavity can pass through the mold parts 101-102.

For example, thermoplastics suitable for making the mold parts can include: polystyrene; polyvinylchloride; polyolefin, such as polyethylene and polypropylene; copolymers or mixtures of styrene with acrylonitrile or butadiene, polyacrylonitrile, polyamides, polyesters, cyclic olefin copolymers such as Topas available from Ticona or Zeonor available from Zeon, combinations of any of the foregoing, or other known material.

Following polymerization of the reaction mixture to form a lens 100, the lens surface 103 will typically adhere to the mold part surface 104. The steps of the present invention facilitate release of the surface 103 from the mold part surface.

The first mold part 101 can be separated from the second mold part 102 in a demolding process. In some embodiments, the lens 100 will have adhered to the second mold part 102 (i.e. the front curve mold part) during the cure process and remain with the second mold part 102 after separation until the lens 100 has been released from the front curve mold part 102. In other embodiments, the lens 100 can adhere to the first mold part 101.

The lens 100 and the mold part to which it is adhered after demolding are contacted with an aqueous solution. The aqueous solution can be heated to any temperature below the boiling point of the aqueous solution. For example, in one embodiment, the aqueous solution may be raised to a temperature of. Heating can be accomplished with a heat exchange unit to minimize the possibility of explosion, or by any other feasible means or apparatus for heating a liquid.

As used herein, processing includes the steps of removing the lens from the mold and removing or exchanging the diluent with an aqueous solution. The steps may be done separately, or in a single step or stage. The processing temperature may be any temperatures between about 10° C. and the boiling point of the aqueous solutions, in some embodiments between about 20° C. and about 95° C. and in other embodiments between about 40° C. to about 80° C., between about 30° C. and 70° C.

The aqueous solution is primarily water. In some embodiments, the aqueous solution is at least about 70 wt % water, and in other embodiments at least about 90 weight % water and in other embodiments at least about 95%. The aqueous solution may also be a contact lens packaging solution such as borate buffered saline solution, sodium borate solutions, sodium bicarbonate solutions and the like. The aqueous solution may also include additives, such as Tween 80, which is polyoxyethylene sorbitan monooleate, Tyloxapol, octylphenoxy (oxyethylene) ethanol, amphoteric 10), preservatives (e.g. EDTA, sorbic acid, DYMED, chlorhexadine gluconate, hydrogen peroxide, thimerosal, polyquad, polyhexamethylene biguanide, antibacterial agents, lubricants, salts and buffers. In some embodiments, additives can be added to the hydration solution in amounts varying between 0.01% and 10% by weight, but cumulatively less than about 10% by weight.

In embodiments where a protonated diluent is used, the aqueous solution has a pH sufficient to deprotonate the protonated diluent, and form a deprotonated diluent which is water miscible. In embodiments where the protonated diluent is an acid, the pH of the aqueous solution is less than about 10, and in some embodiments between about 7 and about 10. In embodiments where the protonatable diluent is an amine, the pH of the aqueous solution is greater than about 4 and in some embodiments between about 4 and about 7.

Exposure of the ophthalmic lens 100 to the aqueous solution can be accomplished by any method, such as washing, spraying, soaking, submerging, or any combination of the aforementioned. For example, in some embodiments, the lens 100 can be washed with an aqueous solution comprising deionized water in a hydration tower.

In embodiments using a hydration tower, front curve mold parts 102 containing lenses 100 can be placed in pallets or trays and stacked vertically. The aqueous solution can be introduced at the top of the stack of lenses 100 so that the solution will flow downwardly over the lenses 100. The solution can also be introduced at various positions along the tower. In some embodiments, the trays can be moved upwardly allowing the lenses 100 to be exposed to increasingly fresher solution.

In other embodiments, the ophthalmic lenses 100 are soaked or submerged in the aqueous solution.

The contacting step can last up to about 12 hours, in some embodiments up to about 2 hours and in other embodiments from about 2 minutes to about 2 hours; however, the length of the contacting step depends upon the lens materials, including any additives, the materials that are used for the solutions or solvents, and the temperatures of the solutions. Sufficient treatment times typically shrink the contact lens and release the lens from the mold part. Longer contacting times will provide greater leaching.

The volume of aqueous solution used may be any amount greater than about 1 ml/lens and in some embodiments greater than about 5 ml/lens.

In some methods, after separation or demolding, the lenses on the front curves, which may be part of a frame, are mated with individual concave slotted cups to receive the contact lenses when they release from the front curves. The cups can be part of a tray. Examples can include trays with 32 lenses each, and 20 trays that can be accumulated into a magazine.

According to another embodiment of the present invention the lenses are submerged in the aqueous solution. In one embodiment, magazines can be accumulated and then lowered into tanks containing the aqueous solution. The aqueous solution may also include other additives as described above.

The biomedical devices, and particularly ophthalmic lenses of the present invention have a balance of properties which makes them particularly useful. Such properties include clarity, water content, oxygen permeability and contact angle. Thus, in one embodiment, the biomedical devices are contact lenses having a water content of greater than about 17%, greater than about 20% and in some embodiments greater than about 25%.

As used herein clarity means substantially free from visible haze. Clear lenses have a haze value of less than about 150%, more preferably less than about 100% compared to a CSI lens.

Suitable oxygen permeabilities include those greater than about 40 barrer and in some embodiments greater than about 60 barrer.

Also, the biomedical devices, and particularly ophthalmic devices and contact lenses have average contact angles (advancing) which are less than about 80°, less than about 75° and in some embodiments less than about 70°. In some embodiments the articles of the present invention have combinations of the above described oxygen permeability, water content and contact angle. All combinations of the above ranges are deemed to be within the present invention.

Hansen Solubility Parameter

The Hansen solubility parameter, $\delta p$ may be calculated by using the group contribution method described in Barton, CRC Handbook of Solubility Par., 1st. Ed. 1983, page 85-87 and using Tables 13, 14.

Haze Measurement

Haze is measured by placing a hydrated test lens in borate buffered saline in a clear 20×40×10 mm glass cell at ambient temperature above a flat black background, illuminating from below with a fiber optic lamp (Titan Tool Supply Co. fiber optic light with 0.5" diameter light guide set at a power setting of 4-5.4) at an angle 66° normal to the lens cell, and capturing an image of the lens from above, normal to the lens cell with a video camera (DVC 1300C:19130 RGB camera with Navitar TV Zoom 7000 zoom lens) placed 14 mm above the lens platform. The background scatter is subtracted from the scatter of the lens by subtracting an image of a blank cell using EPIX XCAP V 1.0 software. The subtracted scattered light image is quantitatively analyzed, by integrating over the central 10 mm of the lens, and then comparing to a −1.00 diopter CSI Thin Lens®, which is arbitrarily set at a haze value of 100, with no lens set as a haze value of 0. Five lenses are analyzed and the results are averaged to generate a haze value as a percentage of the standard CSI lens. Lenses have haze levels of less than about 150% (of CSI as set forth above) and in some embodiments less than about 100%.

Water Content

The water content of contact lenses was measured as follows: Three sets of three lenses are allowed to sit in packing solution for 24 hours. Each lens is blotted with damp wipes and weighed. The lenses are dried at 60° C. for four hours at a pressure of 0.4 inches Hg or less. The dried lenses are weighed. The water content is calculated as follows:

$$\% \text{ water content} = \frac{(\text{wet weight} - \text{dry weight})}{\text{wet weight}} \times 100$$

The average and standard deviation of the water content are calculated for the samples and are reported.

Modulus

Modulus is measured by using the crosshead of a constant rate of movement type tensile testing machine equipped with a load cell that is lowered to the initial gauge height. A suitable testing machine includes an Instron model 1122. A dog-bone shaped sample having a 0.522 inch length, 0.276 inch "ear" width and 0.213 inch "neck" width is loaded into the grips and elongated at a constant rate of strain of 2 in/min. until it breaks. The initial gauge length of the sample (Lo) and sample length at break (Lf) are measured. Twelve specimens of each composition are measured and the average is reported. Percent elongation is =[(Lf−Lo)/Lo]×100. Tensile modulus is measured at the initial linear portion of the stress/strain curve.

Advancing Contact Angle

The advancing contact angle was measured as follows. Four samples from each set were prepared by cutting out a center strip from the lens approximately 5 mm in width and equilibrated in packing solution. The wetting force between the lens surface and borate buffered saline is measured at 23° C. using a Wilhelmy microbalance while the sample is being immersed into or pulled out of the saline.

The following equation is used $$F = 2\gamma p \cos\theta \text{ or } \theta = \cos^{-1}(F/2\gamma p)$$

where F is the wetting force, $\gamma$ is the surface tension of the probe liquid, p is the perimeter of the sample at the meniscus and $\theta$ is the contact angle. The advancing contact angle is obtained from the portion of the wetting experiment where the sample is being immersed into the packing solution. Each sample was cycled four times and the results were averaged to obtain the advancing contact angles for the lens.

Dk

The Dk is measured as follows. Lenses are positioned on a polarographic oxygen sensor consisting of a 4 mm diameter gold cathode and a silver ring anode then covered on the upper side with a mesh support. The lens is exposed to an atmosphere of humidified 2.1% $O_2$. The oxygen that diffuses through the lens is measured by the sensor. Lenses are either stacked on top of each other to increase the thickness or a thicker lens is used. The L/Dk of 4 samples with significantly different thickness values are measured and plotted against the thickness. The inverse of the regressed slope is the Dk of the sample. The reference values are those measured on commercially available contact lenses using this method. Balafilcon A lenses available from Bausch & Lomb give a measurement of approx. 79 barrer. Etafilcon lenses give a measurement of 20 to 25 barrer. (1 barrer=$10^{-10}$ ($cm^3$ of gas×$cm^2$)/($cm^3$ of polymer×sec×cm Hg)).

The Examples below further describe this invention, but do not limit the invention. They are meant only to suggest a method of practicing the invention. Those knowledgeable in the field of contact lenses as well as other specialties may find other methods of practicing the invention. However, those methods are deemed to be within the scope of this invention.

Some of the other materials that are employed in the Examples are identified as follows:

| | |
|---|---|
| DMA | N,N-dimethylacrylamide |
| HEMA | 2-hydroxyethyl methacrylate |
| Norbloc | 2-(2'-hydroxy-5-methacrylyloxyethylphenyl)-2H-benzotriazole |
| PVP | poly(N-vinyl pyrrolidone) (K value 90) |
| IPA | isopropyl alcohol |
| D3O | 3,7-dimethyl-3-octanol |
| TPME | tripropylene glycol methyl ether |
| TEGDMA | tetraethyleneglycol dimethacrylate |
| CGI 819 | bis(2,4,6-trimethylbenzoyl)-phenyl phosphine oxide |
| NVP | N-vinylpyrrolidone |
| OH-mPDMS | mono-(3-methacryloxy-2-hydroxypropyloxy)propyl terminated, mono-butyl terminated polydimethylsiloxane (MW 612), prepared as in Example 28 |

Examples 1-11

Reaction mixtures consisting of 80 wt % monomer components, in the amounts listed in Table 1; and 20 wt % diluent, listed in Table 1 were prepared. Reaction mixtures were degassed at about 600-700 mmHg for approximately 30 minutes at ambient temperature. The reaction mixtures were then dosed into thermoplastic contact lens molds (front curves made from Zeonor, and back curves from polypropylene), and irradiated at 1.2 to 1.8 mW/$cm^2$ using Philips TL 20W/03T fluorescent bulbs under a nitrogen atmosphere for 25 minutes at 55±5° C. The resulting lenses were hand demolded and released by submerging lenses in the front curve (FC) molds in DI water at 90(±10)° C. for about 2 minutes. If lenses did not release from the FC mold at 2 minutes, lenses were maintained under the 90(±5)° C. DI water and squirted with same DI water using a disposable pipette. If lenses still failed to release from the FC, lenses were then manually swabbed from the FC. Lenses were than transferred to jars and underwent two "change-out" steps—Step 1) DI water at 90(±5)° C. for a minimum of 30 minutes and Step 2) DI water at 25(±5)° C. for a minimum of 30 minutes. Lenses were then equilibrated in packing solution and inspected in packing solution. Lenses were packaged in vials containing 5 to 7 mL borate buffered saline solution, capped and sterilized at 120° C. for 30 minutes. Dynamic contact angle (DCA) results are listed in Table 3.

TABLE 1

| Monomer Components | |
|---|---|
| Monomers | wt. % |
| HO-mPDMS | 55 |
| TEGDMA | 3 |
| DMA | 19.53 |
| HEMA | 8.00 |
| PVP K-90 | 12 |
| CGI 819 | 0.25 |
| Norbloc | 2.2 |
| Blue HEMA | 0.02 |

TABLE 2

| Ex. # | Diluent | DCA | Observation |
|---|---|---|---|
| 1 | D3O | 75(7) | |
| 2 | Decanol | 77(4) | |
| 3 | Decanoic Acid | 65(6) | |
| 4 | Hydroxycitronellol | — | Opaque, crumbly lens |
| 5 | 1-Butanol | 74(4) | |
| 6 | t-Amyl Alcohol | 64(4) | |
| 7 | Isopropanol | 76(17) | |
| 8 | TPME | 67(5) | |
| 9 | Ethyl Lactate | — | Opaque, crumbly lens |
| 10 | 1-Methyl-2-Pyrrolidinone | 96(8) | Opaque lens |
| 11 | N,N-Dimethylpropionamide | 107(6) | Opaque lens |

D30 was not water processable. Example 8 was repeated varying concentrations of TPME. Varying concentration produced contact lenses having significantly varying contact angles.

Examples 2-21

Reaction mixtures consisting of 55 wt % monomer components, in the amounts listed in Table 1; and 45 wt % diluent (a mixture of 55 wt % TPME and 45 wt % co-diluent listed in Table 3) were prepared. Reaction mixtures were degassed at about 600-700 mmHg for approximately 30 minutes at ambient temperature. The reaction mixtures were then dosed into thermoplastic contact lens molds (front curves made from Zeonor, and back curves from polypropylene), and irradiated at 1.2 to 1.8 mW/cm² using Philips TL 20W/03T fluorescent bulbs under a nitrogen atmosphere for 25 minutes at 55±5° C. The resulting lenses were hand demolded and released by submerging lenses in the front curve (FC) molds in DI water at 90(±10)° C. for about 5 minutes. If lenses did not release from the FC mold at 5 minutes, lenses were maintained under the 90(±5)° C. DI water and squirted with same DI water using a disposable pipette. If lenses still failed to release from the FC, lenses were then manually swabbed from the FC. Lenses were than transferred to jars and underwent two "change-out" steps—Step 1) DI water at 90(±5)° C. for a minimum of 30 minutes and Step 2) DI water at 25(±5)° C. for a minimum of 30 minutes. Lenses were then equilibrated in packing solution and inspected in packing solution. Lenses were packaged in vials containing 5 to 7 mL borate buffered saline solution, capped and sterilized at 120° C. for 30 minutes. Dynamic contact angle (DCA) results are listed in Table 3.

TABLE 3

DCAs from Examples 12-21

| Ex. # | Diluent | DCA | Comment |
|---|---|---|---|
| 12 | 55 wt % TPME/45 wt % decanol | 87(1) | |
| 13 | 55 wt % TPME/45 wt % Decanoic Acid | 66(5) | |
| 14 | 55 wt % TPME/45 wt % Hydroxycitronellol | — | Opaque, crumbly lens |
| 15 | 55 wt % TPME/45 wt % 1-Butanol | 80(4) | |
| 16 | 55 wt % TPME/45 wt % t-Amyl Alcohol | 75(12) | |
| 17 | 55 wt % TPME/45 wt % Isopropanol | 101(5) | |
| 18 | TPME | 82(14) | |
| 19 | 55 wt % TPME/45 wt % Ethyl Lactate | 88(8) | Opaque lens |
| 21 | 55 wt % TPME/45 wt % N,N-Dimethylpropionamide | 97(4) | |

Example 18 was repeated under various conditions. Varying conditions and even repeating the Example under the same conditions, gave contact lenses having wide variability in their average contact angles Example 13 produced lenses which displayed both low and stable DCA values, even when repeated in multiple runs and under various conditions.

Example 22

Lenses were prepared as per Example 13, except that release was performed in packing solution. That is, the resulting lenses were hand demolded and released by submerging lenses in the front curve (FC) molds in packing solution at 90(±10)° C. for about 5 minutes. If lenses did not release from the FC mold at 5 minutes, lenses were maintained under the 90(±5)° C. packing solution and squirted with same packing solution using a disposable pipette. If lenses still failed to release from the FC, lenses were then manually swabbed from the FC. Lenses were than transferred to jars and underwent two "change-out" steps—Step 1) Packing solution at 25(±5)° C. for a minimum of 30 minutes and Step 2) Packing solution at 25(±5)° C. for a minimum of 30 minutes. Lenses were then inspected in packing solution. Lenses were packaged in vials containing 5 to 7 mL borate buffered saline solution, capped and sterilized at 120° C. for 30 minutes. Dynamic contact angle (DCA) results and release results are listed in Table 4.

Example 23

A reaction mixture consisting of 55 wt % monomer components, in the amounts listed in Table 1; and 45 wt % 1-decanoic acid as diluent was prepared. The reaction mixture was degassed at about 600-700 mmHg for approximately 30 minutes at ambient temperature. The reaction mixtures were then dosed into thermoplastic contact lens molds, and irradiated at 1.2 to 1.8 mW/cm² using Philips TL 20W/03T fluorescent bulbs under a nitrogen atmosphere for 25 minutes at 55±5° C. The resulting lenses were hand demolded and released by submerging lenses in the front curve (FC) molds in packing solution at 90(±10)° C. for about 5 minutes. Lenses were than transferred to jars and underwent two "change-out" steps—Step 1) Packing solution at 25(±5)° C. for a minimum of 30 minutes and Step 2) Packing solution at 25(±5)° C. for a minimum of 30 minutes. Lenses were then inspected in packing solution. Lenses were packaged in vials containing 5 to 7 mL borate buffered saline solution, capped and sterilized at 120° C. for 30 minutes. Dynamic contact angle (DCA) results and release results are listed in Table 4.

TABLE 4

| Ex # | DCA | Release |
|---|---|---|
| 13 | 66(5) | (DI Release) - lenses had to be swabbed off |
| 22 | 62(7) | (PS Release) - edge lift of lens at about 2 minutes; complete lens release at 5-6 minutes |
| 23 | 63(3) | (PS Release) - edge lift of lens at about 2 minutes; complete lens release at 5-6 minutes |

Inclusion of a protonated diluent provided easier release using packing solution.

Examples 24-27

A reaction mixture consisting of 55 wt % monomer components, listed in the appropriate amounts in Table 2; and 45 wt % diluent, diluent make up of 55 wt % TPME and 45 wt % co-diluent listed in Table 5 were prepared. The reaction mixtures was degassed at about 600-700 mmHg for approximately 30 minutes at ambient temperature. The reaction mixtures were then dosed into thermoplastic contact lens molds, and irradiated at 1.2 to 1.8 mW/cm² using Philips TL 20W/03T fluorescent bulbs under a nitrogen atmosphere for 25 minutes at 55±5° C. The resulting lenses were hand demolded and released by submerging lenses in the front curve (FC) molds in packing solution at 90(±10)° C. for about 5 minutes. Lenses were than transferred to jars and underwent two "change-out" steps—Step 1) Packing solution at 25(±5)° C. for a minimum of 30 minutes and Step 2) Packing solution at 25(±5)° C. for a minimum of 30 minutes. Lenses were then inspected in packing solution. Lenses were packaged in vials containing 5 to 7 mL borate buffered saline solution, capped and sterilized at 120° C. for 30 minutes. Dynamic contact angle (DCA) results and release results are listed in Table 5.

TABLE 5

DCAs and Release Results from Examples 24-27

| Ex. # | Diluent | DCA | Release |
|---|---|---|---|
| 24 | 55 wt % TPME/45 wt % 1-Octanoic Acid | — | (DI Release) - lenses had to be swabbed off and did not give viable lenses |

TABLE 5-continued

DCAs and Release Results from Examples 24-27

| Ex. # | Diluent | DCA | Release |
|---|---|---|---|
| 25 | 55 wt % TPME/45 wt % 1-Octanoic Acid | 64(8) | (PS Release) - edge lift of lens at about 2 minutes; complete lens release at 5-6 minutes |
| 26 | 55 wt % TPME/45 wt % 1-Hexanoic Acid | 61(3) | (DI Release) - edge lift of lens at about 3-4 minutes; complete lens release at about 6-7 minutes |
| 27 | 55 wt % TPME/45 wt % 1-Hexanoic Acid | 67(2) | (PS Release) - edge lift of lens at about 1 minutes; complete lens release at 3-4 minutes |

The Examples using packing solution as the release solution showed improved release compared to the Examples using the same diluent and DI water (Examples 25 and 27 compared respectively to Examples 24 and 26). Comparing Example 26 to Examples 24 and 13, a shorter carbon chain in the protonated diluent allows for release using DI water.

Example 28

To a stirred solution of 45.5 kg of 3-allyloxy-2-hydroxypropane methacrylate (AHM) and 3.4 g of butylated hydroxy toluene (BHT) was added 10 ml of Pt (0) divinyltetramethyldisiloxane solution in xylenes (2.25% Pt concentration) followed by addition of 44.9 kg of n-butylpolydimethylsilane. The reaction exotherm was controlled to maintain reaction temperature of about 20° C. After complete consumption of n-butylpolydimethylsilane, the Pt catalyst was deactivated by addition of 6.9 g of diethylethylenediamine. The crude reaction mixture was extracted several times with 181 kg of ethylene glycol until residual AHM content of the raffinate was <0.1%. 10 g of BHT was added to the resulting raffinate, stirred until dissolution, followed by removal of residual ethylene glycol affording 64.5 kg of the OH-mP-DMS. 6.45 g of 4-Methoxy phenol (MeHQ) was added to the resulting liquid, stirred, and filtered yielding 64.39 kg of final OH-mPDMS as colorless oil.

What is claimed is:

1. A process comprising the steps of curing a reactive mixture comprising at least one silicone-containing component, at least one hydrophilic component and a diluent comprising at least one protonated diluent or protonatable diluent having a Hansen solubility parameter, δp between about 2 and about 7 and at least one co-diluent having a Hansen solubility parameter, δp between about 2 and about 7 to form an ophthalmic device having a haze value of less than 100% and an advancing contact angle of less than about 80°; contacting the ophthalmic device with an aqueous solution which is capable of changing the Hansen solubility parameter, δp of the protonated or protonatable co-diluent to enhance water solubility, wherein said aqueous solution comprises at least about 70% water and (a) a pH of about 7 to about 10 when said diluent comprises at least one protonated diluent or (b) a pH of about 4 to about 7 when said diluent comprises at least one protonatable diluents and removing said diluent(s) with said aqueous solution.

2. The process of claim 1 wherein said co-diluent is selected from the group consisting of alcohols having 2 to 20 carbons and a carbon: oxygen from hydroxyl ratio of up to about 8:about 1, amides having 10 to 20 carbon atoms derived from primary amines and carboxylic acids having 6 to 20 carbon atoms and mixtures thereof.

3. The process of claim 1 wherein said diluent is selected from the group consisting of alcohols having 5 to 20 carbons and having a carbon: oxygen from hydroxyl ratio of about 3:about 1 to about 6:about 1 and mixtures thereof.

4. The process of claim 1 wherein said removing step is conducted at a temperature of about to about 20° C. to about 95° C.

5. The process of claim 1 wherein said removing step is conducted at a temperature of about 70° C. to about 95° C.

6. The process of claim 1 wherein said reactive mixture comprises from about 30 to about 85 weight percent silicone-containing component(s) based upon all reactive components in the reaction mixture.

7. The process of claim 1 wherein said reactive mixture comprises from about 10 to about 60 weight percent hydrophilic component(s), based upon all reactive components in the reaction mixture.

8. The process of claim 1 wherein said silicone-containing component comprises at least one mono-functional silicone monomer.

9. The process of claim 8 wherein said at least one mono-functional silicone is selected from the group consisting of mono-(2-hydroxy-3-methacryloxypropyl)-propyl ether terminated polydimethylsiloxane, monomethacryloxypropyl terminated mono-n-butyl terminated polydimethylsiloxanes, 2-methyl-,2-hydroxy-3-[3-[1,3,3,3-tetramethyl-1-[(trimethylsilyl)oxy]disiloxanyl]propoxy]propyl ester and mixtures thereof.

10. The process of claim 1 wherein said hydrophilic component comprises at least one hydrophilic monomer selected from the group consisting of N,N-dimethyl acrylamide, 2-hydroxyethyl acrylate, glycerol methacrylate, 2-hydroxyethyl methacrylamide, N-vinylpyrrolidone, N-vinyl methacrylamide, 2-hydroxyethyl methacrylate, polyethyleneglycol monomethacrylate, polyvinylpyrrolidone and mixtures thereof.

11. The process of claim 1 wherein said hydrophilic component comprises at least one hydrophilic monomer selected from the group consisting of N,N-dimethyl acrylamide, N-vinylpyrrolidone, 2-hydroxyethyl methacrylate and mixtures thereof.

12. The process of claim 1 wherein the reactive mixture further comprises at least one hydrophilic polymer.

13. The process of claim 12 wherein the at least one hydrophilic polymer is present in the reactive mixture in an amount between about 1 to about 17 weight % of all reactive components in the reactive mixture.

14. The process of claim 12 wherein the hydrophilic polymer comprises poly-N-vinylpyrrolidone.

15. The process of claim 1 wherein said protonated diluent is selected from the group consisting of carboxylic acids having 6 to 18 carbon atoms, phenols substituted with $C_{6-10}$ alkyl groups, and mixtures thereof and said at least one protonatable diluent is selected from the group consisting of amines having 6-14 carbon atoms and mixtures thereof.

16. The process of claim 15 wherein said at least one protonated diluent is selected from the group consisting of decanoic acid, hexanoic acid, octanoic acid, dodecanoic acid, and mixtures thereof and said protonatable diluent is an amine selected from the group consisting of decyl amine, octyl amine, hexyl amine and mixtures thereof.

17. The process of claim 15 wherein said at least one protonated diluent comprises decanoic acid.

18. The process of claim 1 wherein said silicone-containing component comprises mono-(3-methacryloxy-2-hydroxypropyloxy)propyl terminated, mono-butyl terminated polydimethylsiloxanes and said hydrophilic component comprises N,N-dimethylacrylamide and at least one hydrophilic polymer.

19. The process of claim 18 wherein said hydrophilic component further comprises 2-hydroxyethyl methacrylate.

20. The process of claim 18 wherein said silicone-containing component is present in an amount of about 45 to about 75 weight percent, said hydrophilic components is present in an amount of about 20 to about 50 weight %, and said diluent further comprises tripropylene glycol methyl ether.

21. A process comprising the steps of reacting a reactive mixture comprising at least one silicone-containing component, at least one hydrophilic component, and at least one protonated diluent or protonatable diluent and about 7 and at least one co-diluent having a Hansen solubility parameter, δp between about 2 and about 7, to form an ophthalmic device having a haze value of less than 100% and an advancing contact angle of less than about 80°; and contacting the ophthalmic device with an exchange solution which is capable of changing the Hansen solubility parameter, δp of the protonated or protonatable diluent above water solubility wherein said exchange solution comprises at least about 70% water and (a) a pH of about 7 to about 10 when said diluent comprises at least one protonated diluent or (b) a pH of about 4 to about 7 when said diluent comprises at least one protonatable diluents.

22. The process of claim 21 wherein said reactive mixture comprises at least one protonated diluent is selected from the group consisting of carboxylic acids having 6 to 18 carbon atoms, phenols substituted with $C_{6-10}$ alkyl groups, and mixtures thereof.

23. The process of claim 21 wherein said at least one protonated diluent is selected from the group consisting of decanoic acid, hexanoic acid, octanoic acid, dodecanoic acid, and mixtures thereof and said protonatable diluent is selected from the group consisting of decyl amine, octyl amine, hexyl amine, mixtures thereof.

24. The process of claim 21 wherein said at least one protonated diluent comprises decanoic acid.

* * * * *